United States Patent Office 2,979,135
Patented Apr. 11, 1961

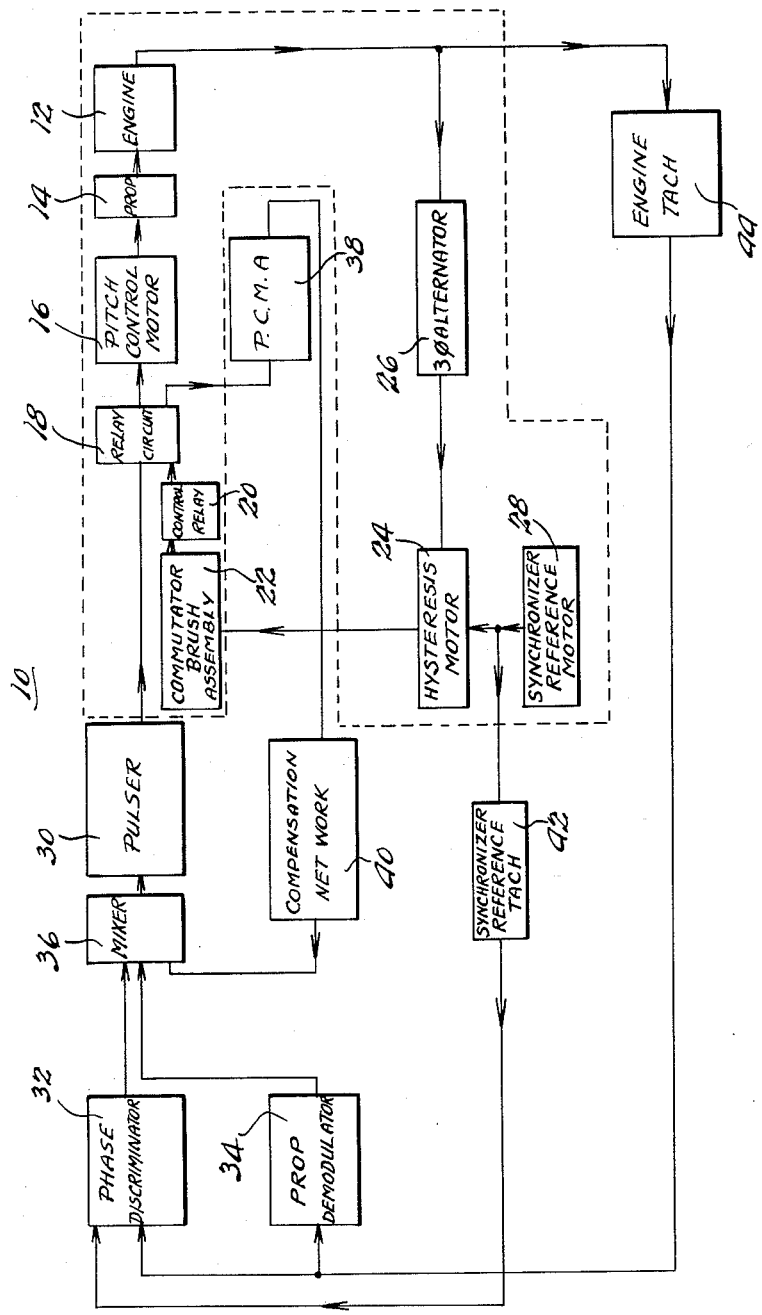

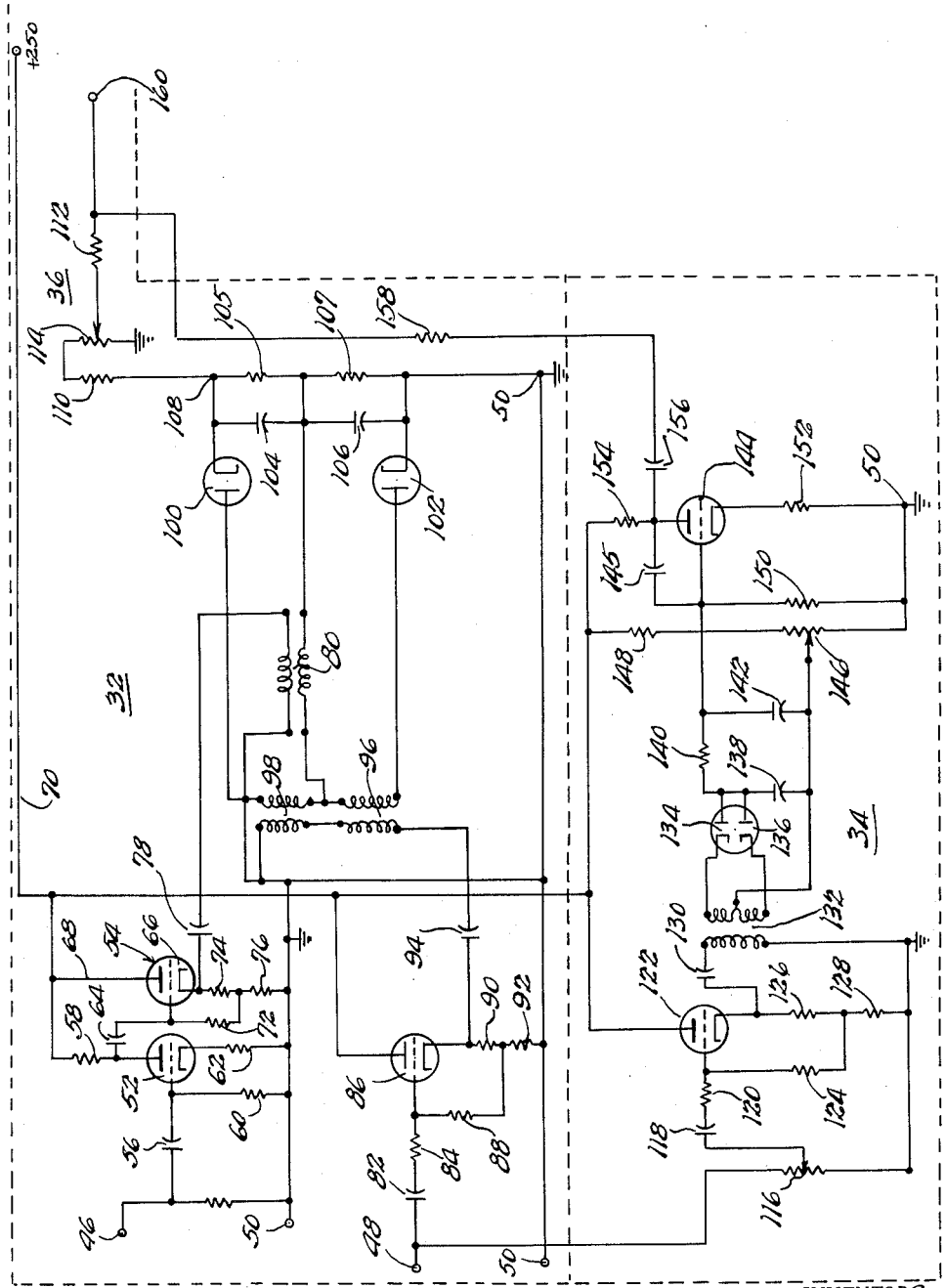

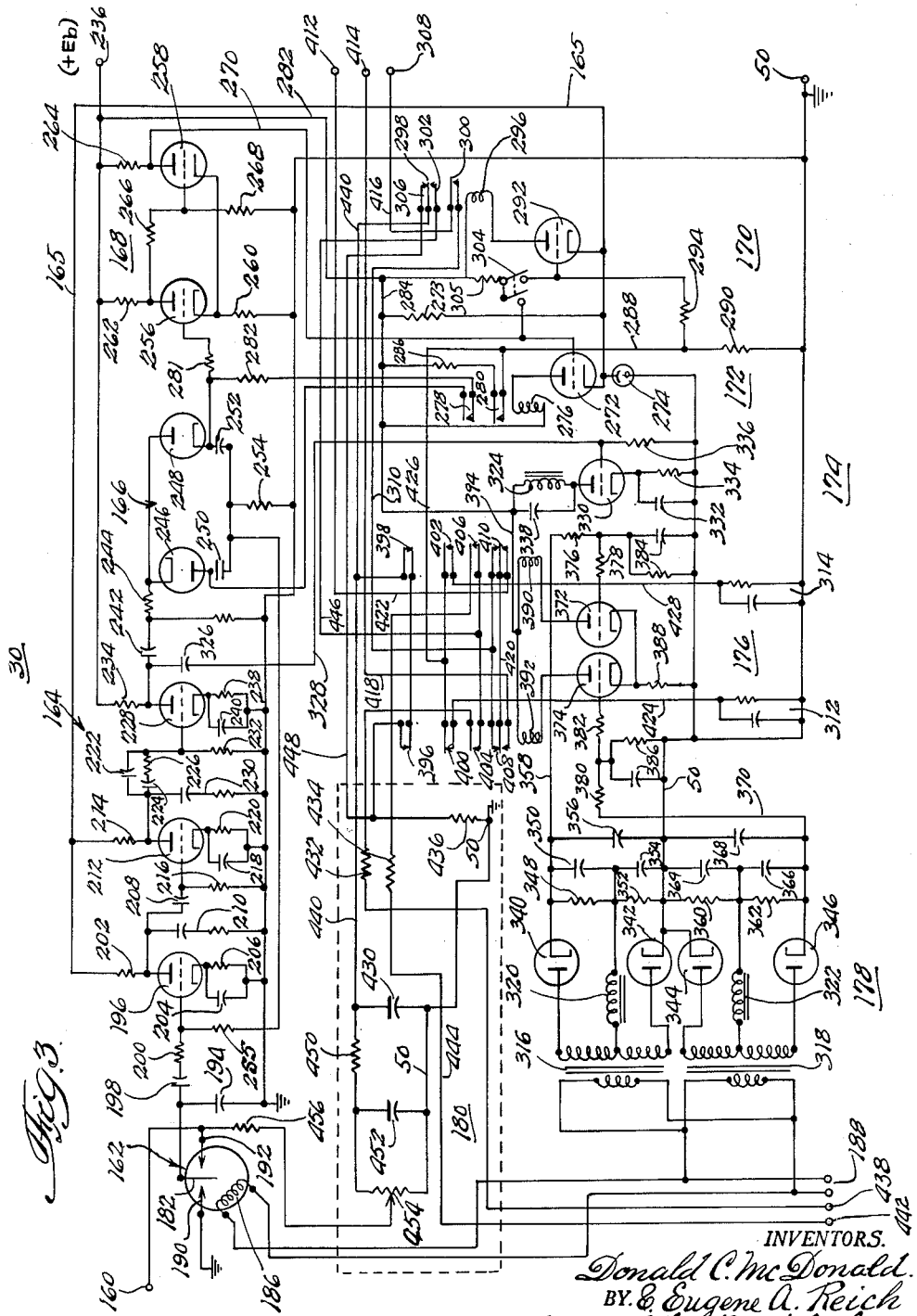

2,979,135

PHASE SYNCHRONIZING SYSTEM

Donald C. McDonald, Evanston, Ill., and Eugene A. Reich, Kenosha, Wis., assignors, by mesne assignments, to Cook Electric Company, Chicago, Ill., a corporation of Delaware Filed June 1, 1956, Ser. No. 588,797

10 Claims. (Cl. 170—160.17)

This invention relates to an improved follow-up system and more particularly to a follow-up system for continuously controlling the instantaneous position of a remote rotating member by comparing the position of the rotating member with a standard.

The particular circumstance which led to the concept herein disclosed was the desirability of synchronizing aircraft propellers to maintain not only velocity agreement therebetween but also positional or phasic agreement. It is believed that one source of irritating vibration in propeller driven aircraft has been the action of the various propellers in multiengine aircraft generating irregular vibration and air motion as a result of random variations in phase.

All modern propeller driven multiengine aircraft utilize systems for maintaining the engines at a constant speed while producing changes in torque, and consequently acceleration and deceleration, through variations in the pitch angle of the propellers. Thereby the engine may always be operated at optimum speeds for maximum horsepower and efficiency and minimum wear and deterioration. Various systems are now in use for maintaining the speeds of the engines in multiengine aircraft in substantial agreement, for example by comparing the speeds of the various engines with a rotating standard in the aircraft fuselage. A servomechanism is generally employed to control the pitch of a given propeller in accordance with the differences between the engine speed and the speed of the standard, increasing the pitch angle of the propeller when the engine is running at a higher speed than the standard, and decreasing the pitch angle when it is desired to increase the engine speed. The same speed agreement may be maintained by using a servomechanism for comparing the speed of all of the engines with any one of the engines, and the instant invention is equally applicable to this type of system. The instant invention is an improvement and modification of the described system in that it not only maintains velocity agreement between various engines of a multiengine aircraft, but also maintains said engines in phasic agreement.

It is therefore one important object of this invention to provide an improved system for maintaining positional synchronism between a plurality of rotating elements.

It is another object of this invention to provide an improved system for maintaining the engines of a multiengine aircraft in positional agreement at all times.

It is still a further object of this invention to provide a system for maintaining a plurality of aircraft engines in positional agreement, said system having optimum speed of response and dynamic and static stability.

It is a further object of this invention to provide an improved system for positionally synchronizing aircraft engines in which the servomechanism is applied to sense both velocity and positional discrepancies between a given engine speed and a standard.

It is still another object of this invention to provide an improved system for positional synchronization of aircraft engines employing a servomechanism having a plurality of inner feedback loops.

It is another object of this invention to provide an improved system for positional synchronization of the engines of an aircraft, the system including a servomechanism capable of determining the dynamic characteristics of an inaccessible servomechanism element.

It is a further object of this invention to provide an improved servomechanism employing synthetic analogues of inaccessible elements in the system providing improved stability in over-all operation.

It is still another object of this invention to provide an improved system for positional synchronization of a plurality of aircraft engines which is completely compatible with existing speed synchronizing systems.

Another object of the invention is the provision of an electronic system for generating pulses in accordance with the integrated magnitudes of signals representing phase and speed discrepancies in the system whereby improved stable control is produced.

Further and additional objects of this invention will become manifest from a consideration of this specification, the accompanying drawings and the appended claims.

In a typical speed synchronizing installation for aircraft engine control, the basic system includes variable propellers controlled by pitch control motors energized from an intermittent relay. The intermittent relay is actuated through a modulator and also by a hysteresis motor rotated by differences in the relative speeds of a standard motor and a three-phase alternator driven from the aircraft engine. Such a system is responsive only to speed and will not provide phase or position synchronization. A system of this type is described in the pending application of Donald C. McDonald, entitled, "Follow-up System" and filed on May 10, 1956, Serial No. 584,071.

By this invention a source of electrical signals is provided in which the signal corresponds to the instantaneous position of a standard motor and a second signal is generated which corresponds to the instantaneous position of the engine to be controlled. These signals are combined with a feedback signal which is related to engine acceleration and the signals are utilized in an additive combination to control the propeller pitch and, thereby, increase or retard engine speed in order to adjust the instantaneous angular position of the propeller shaft until it corresponds with the angular position of the standard motor.

The signals are utilized in the particular system described herein by amplifying and integrating the signal sum and intermittently pulsing a pitch control motor in response to the integrated signals. More particularly, an all-electronic system is provided which produces signals corresponding to relative phase and relative speed of a propeller and a reference source. It integrates any differences in relative phase and speed to control a plusing circuit which will change the propeller pitch in a step-like manner to produce greater stability and improved phase accuracies. An improved pitch control motor analogue of simplified construction and improved response is also utilized whereby access to the propeller hub is not required. The advantages of such an analogue concept have heretofore been set out in the application referred to above.

For a more complete understanding of this invention reference will now be made to the accompanying drawings wherein:

Fig. 1 is a block diagram of an over-all system for providing both speed and phase synchronization in which either mode of control will adequately function irrespective of the condition of the other;

Fig. 2 is a schematic circuit diagram of the phase discriminator and propeller demodulator of Fig. 1; and Fig. 3 is a schematic circuit diagram of the pulser, the relay circuits, pitch control motor analogue and compensation network of Fig. 1.

Referring now to the drawings and more particularly to Fig. 1, a system somewhat similar to that described in the above application is disclosed. In the system 10 an aircraft engine 12 drives a conventional variable pitch propeller 14. Throughout this application, only a single engine and propeller will be referred to, although it will be understood that this invention has its greatest utility in multiengine aircraft. Each engine will have a control identical to the one described and will be operated with a common reference motor. The pitch of propeller 14 is controlled by a pitch control motor 16 which may be energized electrically through a relay circuit 18. It is preferred that the relay circuit 18 apply electric energy to the pitch control motor 16 in the form of pulses of short duration whereby the system will periodically come to rest and will thereby be rendered more stable and less subject to erratic response due to transient phenomena. In the portion of system 10 for effecting speed synchronization the relay circuit 18 is energized from an intermittent control relay 20 which is, in turn, energized from a mechanical commutator brush assembly 22. The commutator brush assembly 22 is rotated by a hysteresis motor 24 in response to differences in frequency between the output of a three-phase alternator 26 driven directly from engine 12 and a reference motor 28. As set out in detail in the previous application referred to above, the synchronous reference motor 28 continuously drives the rotor of hysteresis motor 24, which is energized with a signal from three-phase alternator 26. If the speed of reference motor 28 corresponds to the frequency of the output of alternator 26, the electric field will stand still and consequently the shell, or stator, of hysteresis motor 24 will experience no torque. If the reference motor and alternator are not so coordinated a torque will be produced on the shell of hysteresis motor 24 to close one set of contacts in brush assembly 22. This will, in turn, energize control relay 20 which produces a pulse of predetermined duration to actuate relay circuit 18, energize pitch control motor 16, and, thereby effect a small change in the pitch of propeller 14. Thus, a complete system for speed synchronization is provided.

The portion of system 10 for effecting phase synchronization comprises an electronic pulser 30 which controls relay circuit 18 in response to signals received from a phase discriminator 32 and a propeller signal demodulator 34. The signals from phase discriminator 32 and propeller demodulator 34 are combined in mixer 36 with a synthetic engine acceleration signal from pitch control motor analogue 38 and compensation network 40 representing the composite response characteristic of aircraft engine 12 and pitch control motor 16.

The phase discriminator 32 is energized from a reference tachometer 42 mechanically driven by reference motor 28 and a signal from engine tachometer 44 which is directly driven by the aircraft engine 12. By comparing the two signals from the reference tachometer and engine tachometer, a D.C. signal having an amplitude proportional to the phase difference between the two inputs and an appropriate polarity may be generated in discriminator 32 for application to the mixer 36. The propeller demodulator 34 is energized from engine tachometer 44 and produces a signal, the magnitude of which is directly related to variations in aircraft engine speed. This signal is also applied to the mixer 36.

The circuitry of phase discriminator 32 and propeller demodulator 34 is shown in detail in Fig. 2. The output from reference tachometer 42 is applied to input terminal 46 and the signal from engine tachometer 44 is applied to terminal 48. It will be understood that unless otherwise stated all signals are described relative to ground potential and for each input terminal there will generally be a corresponding ground terminal or ground bus 50. The reference signal is amplified by triode 52 and applied to a cathode follower circuit 54. The signal from terminal 46 is applied through coupling condenser 56 to the grid of triode 52. A conventional plate resistor 58, grid resistor 60 and cathode resistor 62 are provided.

The amplified signal which appears at the plate of triode 52 is applied through coupling condenser 64 to the grid of triode 66 forming a part of cathode follower 54. The plate of triode 66 is connected through conductor 68 to a 250 volt supply bus 70. A grid resistor 72 is connected between two cathode resistors 74 and 76 to produce the desired bias on the grid of triode 66. The output of cathode follower 54 is applied from the cathode through condenser 78 to the primary of a transformer 80, the secondary of which is in a discriminator circuit, to be described hereinafter.

The propeller signal is applied from terminal 48 through coupling condenser 82 and series resistor 84 to a cathode follower including triode 86. Triode 86 has a grid bias resistor 88 connected between cathode resistors 90 and 92. The output of the cathode follower is taken at the cathode of triode 86 and applied through coupling condenser 84 to the primaries of transformers 96 and 98. Transformers 96 and 98 are energized with the common signal from the cathode follower and have their secondaries oriented to produce outputs of opposite phase, while the signal in the secondary of transformer 80 will normally have a phase angle of 90° relative to the signals in the secondaries of transformers 96 and 98. For example, if at a given instant the upper terminal of the secondary winding of transformer 96 is positive, the lower terminal of the secondary winding of transformer 98 is negative relative to the common terminal connected to transformer 80. Thus, if each of the signals is of a single constant value and the desired phase relationship exists, current of equal amplitude will flow through rectifiers 100 and 102 charging condensers 104 and 106 to equal voltage values producing a net voltage between ground terminal 50 and point 108 of zero. Resistors 105 and 107 are connected across condensers 104 and 106, respectively.

In the event that the propeller phase shifts relative to the reference generator, the signal in transformer 80 will shift in phase toward one of the secondary voltages, and thus the signal appearing across one of the condensers 104 and 106 will increase to a greater positive value, while the signal appearing across the other condenser will be diminished. Thus, a net voltage will be produced at point 108, having a polarity corresponding to the polarity of the propeller phase angle relative to the reference signal and a magnitude proportional to the phase difference. This signal is applied to mixer network 36 which includes resistors 110 and 112 and potentiometer 114.

The engine tachometer signal appearing at terminal 48 is also applied to propeller demodulator 34. The signal is applied through potentiometer 116, coupling condenser 118 and series resistor 120 to the grid of a triode 122 forming an additional cathode follower circuit. The plate of triode 122 is connected to the 250 volt D.C. bus 70, and a grid resistor 124 is connected between cathode resistors 126 and 128 in a conventional manner. The output of the cathode follower is applied through condenser 130 to the primary of a center-tapped transformer 132. The secondary terminals of transformer 132 are connected to the cathodes of diode rectifiers 134 and 136 having their plates connected in common to one terminal of condenser 138. The center tap of the secondary winding of transformer 132 is connected to the other terminal of condenser 138 which acts as a storage condenser and filter. Thus, full wave rectification of the incoming signal is provided.

The signal appearing across condenser 138 is further filtered by resistor 140 and condenser 142 and is then applied to the grid of triode 144. The center tap of the secondary winding of transformer 132 and the lower terminals of condensers 138 and 142 are connected to the wiper of a potentiometer 146. Condenser 145 provides negative feedback to reduce any ripple or noise in the signal. The potentiometer 146 is in series with a resistor 148 and the series network is connected between ground 50 and the 250 volt bus 70. Thus, a substantial fixed portion of the signal appearing across condenser 142 is biased out by the D.C. voltage appearing at the wiper of potentiometer 146, simplifying the bias requirements of triode 144 and improving the sensitivity of the demodulator.

The voltage appearing across condenser 142 has a magnitude proportional to the velocity of the aircraft engine 12. This signal is amplified by triode 144 which has a grid resistor 150, a cathode resistor 152 and a plate resistor 154 connected in the conventional manner. A coupling condenser 156 is connected between the plate of triode 144 and a resistor 158 forming a part of mixer network 36. The presence of coupling condenser 156 means that the steady state velocity signal will not be present at terminal 160. Hence, the signal appearing at terminal 160 represents a combination of the output of discriminator 32, which is a D.C. voltage related to phase error and the output of demodulator 34 which is a D.C. voltage representing changes in aircraft engine speed.

The pulser circuit will now be described, as illustrated in Fig. 3. Generally, the pulser 30 includes a chopper 162, a multistage feedback amplifier 164, a current integrator 166, a trigger circuit 168, a pulse timer 170, a timer control circuit 172, a signal amplifier 174, polarity switches 176, a phase sensitive discriminator 178, and a pitch change motor analogue 180. The signals from terminal 160 are applied to one contact 192 of an electromechanical vibrator 162. A further signal from the motor analogue 180 will also appear at terminal 160 and chopper contact 192. A moving vane 182 is attracted by winding 186 which is energized from a source of low A.C. potential 188 and the vane continuously shifts between engagement with a grounded contact 190 and signal contact 192. When the vane 182 is in engagement with signal contact 192 the signal at terminal 160 is applied across storage and coupling condenser 198 and upon engagement of the vane 182 with contact 190, condenser 198 is discharged to ground. Thus, a fixed frequency A.C. signal is generated in which the phase is determined by the polarity of the signal at terminal 160, and the amplitude is proportional to the amplitude of that signal.

The signal appearing across condenser 198 is filtered by condenser 194 to remove high frequency noise and is applied to the grid of the first amplifier tube 196 through resistor 200. Triode 196 is connected in a conventional amplifier circuit having a plate resistor 202 and a cathode network including by-pass condenser 204 and bias resistor 206. The output of triode 196 is applied to the second stage of amplifier 164 through a coupling condenser 208. A high-pass filter network 210 is provided between the plate of triode 196 and ground to remove noise and improve the signal shape.

The second stage of amplifier 164 comprises triode 212 having a plate resistor 214, a grid resistor 216 and a cathode network comprising by-pass condenser 218 and bias resistor 220. The output of the second stage of amplifier 164 is applied through a coupling condenser 222 and a coupling network comprising condenser 224 and resistor 226 to the grid of triode 228 comprising a third stage of amplifier 164. A further high-pass filter 230 is provided in the accompanying network and the grid of triode 228 is connected to ground through resistor 232. The high-pass filters by-pass spurious high frequency noise to ground. Triode 228 has a plate resistor 234 connected to a source of high D.C. potential 236 and is provided with a cathode resistor 238 and by-pass condenser 240.

The output of the third stage of amplifier 164 is applied through coupling condenser 242 to the current integrating circuit 166. The integrating circuit 166 includes a series resistor 244 and a pair of diodes 246 and 248 connected in a manner to oppositely charge integrating condensers 250 and 252, i.e., the diode 246 has its cathode connected to resistor 244, while the diode 248 has its plate connected thereto. Consequently, the condenser 250 has one terminal connected to the plate of diode 246 and the storage condenser 252 has one terminal connected to the cathode of diode 248. The remaining terminals of condensers 250 and 252 are connected together to a common resistor 254 having its other terminal connected to ground. Thus, the condensers 250 and 252 are oppositely charged to equal potentials, the potential being determined by the amplitude of the signal appearing at terminal 160, the magnitude of series resistors 244 and 254, and the total charging time. The purpose of using two charging condensers 250 and 252 is to present a balanced load to the amplifier 164. The resistor 254 is so selected that the current charging condensers 250 and 252 may be made relatively small, while maintaining R-C time constant large enough to require many cycles of the amplified information signal before the condensers become fully charged. A feedback signal from the common terminal of condensers 250 and 252 is applied through resistor 255 to the input of amplifier 164. Thus resistors 200 and 255 function as typical input and feedback impedances in a differential amplifier to maintain linearity.

At a predetermined voltage less than the maximum for the system the positive voltage appearing across condenser 252 is sufficient to actuate the trigger circuit 168. The trigger circuit 168 comprises two triodes 256 and 258 having a common cathode resistor 260. The plates of triodes 256 and 258 are connected through plate resistors 262 and 264, respectively, to the high voltage terminal 236. A grid resistor network including resistors 266 and 268 is connected between the plate of triode 256 and ground. The resistors are so selected that the potential appearing on the grid of triode 258, which is connected to the common terminal of resistors 266 and 268, will be such that tube 258 is normally conducting with a substantial current flowing therein. This produces a substantial voltage across cathode resistor 260, normally biasing triode 256 below the cut-off potential. When the signal appearing across storage condenser 252 becomes sufficient to produce substantial conduction in triode 256, the increased current in cathode resistor 260 and the reduced voltage at the plate of tube 256 will shift the effective bias on triode 258 to a value at or near the cut-off value of that tube. Thus, there will be no current through triode 258, and the voltage appearing at the plate thereof will increase substantially. A large current limiting resistor 281 is provided to limit grid current whenever the grid of triode 256 becomes positive.

This voltage is applied through conductor 270 to the grid of a triode 272 in the control circuit 172. A voltage regulating gaseous tube 274 is disposed in the cathode circuit of triode 272 whereby the cathode is normally maintained at a voltage approximately 105 volts above ground. Tube 274 is maintained in an ionized condition through resistor 273 connected through conductors 284 and 282 to high voltage terminal 236. This gaseous tube also provides a regulated low positive potential for operating the first two stages of amplifier 164 through conductor 165. As the voltage appearing at the plate of triode 258 is substantially less than the cathode potential of triode 272 under normal conditions, triode 272 will be in a nonconducting state. However, when the trigger circuit 168 is actuated, the voltage at the plate of triode 258 rises substantially and this increased positive voltage applied to the grid of triode 272 through conductor 270 produces substantial conduction in tube 272 and energizes relay coil 276.

Energization of relay coil 276 closes switches 278 and 280. Closure of switch 278 will connect the cathode of diode 248 to the plate of diode 246 in the current integrating circuit 166 through a current limiting resistor 282 whereby condensers 250 and 252 will be rapidly discharged to initiate the current integrating process once again. When switch 278 closes, the trigger circuit 168 is deenergized and the signal removed from triode 272. The signal having been removed from triode 272, the relay coil 276 is deenergized and the switch 278 is opened. Thus, the condensers 250 and 252 are once again connected for charging from the amplifier 164 through the diodes 246 and 248.

Closure of switch 280 completes the grid circuit of pulse timer 170. The circuit may be traced from high voltage terminal 236 through conductor 282, conductor 284, resistor 286, switch 280, conductor 288 and resistor 290 to ground terminal 50. Timer networks 312 and 314, in parallel with resistor 290, are thus rapidly charged through resistor 286 to a substantial positive potential. The cathode of triode 292 is connected to the anode of gaseous tube 274, thus maintaining the cathode at a regulated voltage of the order of 105 volts. As the grid of triode 292 is connected to ground whenever switch 280 has been open for a substantial time, the triode has a substantial negative bias and no conduction will occur. However, the resistors 294 and 290 are so connected that upon closure of switch 280 the grid of tube 292 is raised to approximately the cathode potential to produce substantial conduction through relay coil 296 which is connected to the plate of tube 292. Relay coil 296 is in turn connected to conductor 282 and high voltage terminal 236. Energization of coil 296 actuates transfer switch arm 298 to engage contact 302 and open contact 306. Switch 300 is also actuated by coil 296. The purpose of these switches will be clear from the description to follow. Closure of switch 300 applies a voltage from terminal 308 to a conductor 310 which selectively actuates means to increase or decrease propeller pitch, depending upon the condition of polarity switch 176. Switch 298 forms part of the pitch change motor analogue 180 to be described.

As already explained, immediately upon actuation of relay 276 the current integrating condensers 250 and 252 are discharged to deactuate trigger circuit 168, thus ceasing conduction in triode 272 and deenergizing relay 276. However, conduction is maintained in pulse timer 170 by either one of a pair of RC timer networks 312 and 314. The particular timer network employed will depend upon the condition of the polarity switch 176. In the event that continual contactor mode servomechanism operation is desired, the timer 170 may be rendered continuously conductive and the polarity switch 176 will determine the operation of the pitch control motor. A double pole single throw switch 304 is provided in the grid circuits of tubes 272 and 292 to connect said grids to high voltage source 236 through resistor 305 whenever contactor operation is desired.

The polarity switch 176 is controlled by the polarity discriminator 178. The discriminator 178 comprises transformers disposed in a balanced circuit in much the same manner as discriminator 32 described above. The low voltage A.C. signal from terminals 188 which is applied to the operating coil 186 of chopper 162 is also applied to the primaries of transformers 316 and 318. The secondary of each of these transformers has a center tap and is connected to a pair of rectifiers. The secondary of transformer 316 is connected to the plates of rectifiers 340 and 342 and the secondary of transformer 318 is connected to the plates of rectifiers 344 and 346. Secondary windings 320 and 322 of a signal transformer having a primary winding connected in the plate circuit of signal amplifier 174 are connected, respectively, to the center taps of transformers 316 and 318. The primary winding 324 is in the plate circuit of signal amplifier triode 330.

The amplified mixed signal produced by amplifier 164 is applied through coupling condenser 326 and conductor 328 to the grid of triode 330 which forms a part of signal amplifier 174. Triode 330 is connected in a conventional amplifying circuit including a cathode by-pass condenser 332 and bias resistor 334, a large grid resistor 336 and a phase correcting and tuning condenser 338 connected in parallel with the transformer primary 324. The primary 324 is connected through conductors 284 and 282 to high voltage terminal 236. The voltage in secondaries 320 and 322 are in additive phasic relationship with the voltage in one-half of the secondaries of transformers 316 and 318 at all times. Thus, for example, if the algebraic sum of the incoming signal and the feedback D.C. signal from potentiometer 454 at terminal 160 is positive, the voltage in secondaries 320 and 322 may be in phase with the signal in the upper halves of the secondaries of transformers 316 and 318. If the net signal at terminal 160 is negative, it will be in phase with the signal in the lower halves of the secondaries. Of course, if the signal at terminal 160 is small, indicating substantially no error of phase or velocity, the signal in secondaries 320 and 322 will be too small to produce any substantial effect in the output of discriminator 178. This will provide a null or dead zone for contactor mode operation.

Describing the upper half of the discriminator in particular, the cathodes of diodes 342 and 344 are connected together and are in turn connected to ground bus 50. The cathode of diode 340 is connected to a resistor 348 and a condenser 350 which are disposed between the cathode and one terminal of the secondary winding 320. An identical resistor 352 and condenser 354 are connected between the terminal of secondary winding 320 and ground. Thus, when a substantially zero error signal exists in secondary 320 equal and opposite voltages will be produced across condensers 350 and 354, and hence the net voltage appearing across condenser 356 which extends between ground bus 50 and conductor 358 will be zero. If a positive error signal exists at terminal 160, a signal is produced in secondary 320 which is in phase with the signal in the upper secondary of transformer 316, producing a positive voltage across condenser 356. Conversely, a negative signal at terminal 160 provides a negative signal on condenser 356.

The remaining half of discriminator 178 operates in an identical manner. The cathode of diode 344 is connected to ground; the cathode of diode 346 is connected to a series pair of resistors 360 and 362, a serially connected pair of condensers 364 and 366 and a single condenser 368, all connected between cathode conductor 370 and ground bus 50. The secondary winding 322 is connected to the common terminals of resistors 360 and 362 and condensers 364 and 366. Thus, as already described with regard to the first half of the discriminator if a zero error signal exists in transformer secondary 322, the voltages appearing across condensers 364 and 366 will be equal and of opposite polarity and thus the net voltage appearing on condenser 368 will be zero.

Whenever an error signal is applied to signal amplifier 174, it will, in turn, be applied to transformer secondaries 320 and 322 and will produce equal D.C. voltages of opposite polarity on conductors 358 and 370. These signals will be applied respectively to the grids of triodes 372 and 374 of polarity switch 176 through grid resistors 376, 378, 380 and 382. Filter networks 384 and 386 are connected between the grid circuits and ground and in combination with resistors 376 and 380 reject any ripple or noise in the signal. The triodes 372 and 374 have a common cathode resistor 388 whereby increased opposite grid voltage excursions are produced in the two triodes. The triode 372 has a relay coil 390 in its plate circuit and the triode 374 has a relay coil 392 in its plate circuit. The coils 390 and 392 have a common connection through conductors 394, 284 and 282 to high voltage terminal 236. The signal in transformer secondaries 320 and 322 must always be smaller than the signal in transformers 316 and 318 or phase ambiguity will result.

Each of the coils 392 and 390 has an identical set of switch contacts actuated thereby. These include transfer switches 396 and 398, normally open switches 400 and 402, normally open switches 404 and 406 and transfer switches 408 and 410, respectively. In this description it will be assumed that if the signals entering the pulser 30 at terminal 160 including feedback are such that an increase in propeller pitch is desired to produce phase synchronization, the triode 372 will be conductive and relay 390 energized. Consequently, if it is assumed that increased engine velocity is required and thus propeller pitch must be decreased as indicated by the signal applied to pulser 30 at terminal 160, then triode 374 will be conducting and relay coil 392 energized. The field windings of the pitch control motor may be directly connected to the output terminals 412 and 414, although it is possible that these terminals be applied to further control relays which would appear within block 18 of Fig. 1 and that these relays in turn control the current to pitch control motor 16. The terminal 412 is connected to transfer switch 410 and thus will actuate the motor to increase pitch while the terminal 414 is connected to switch 408 of relay 392 and will thus actuate the pitch control motor to decrease pitch.

The signal amplifier 174 and discriminator 178, energized from amplifier 164, provide a highly sensitive circuit whereby one of the relays 390 or 392 will be energized even though the current integrating circuit 166 has not been sufficiently energized to operate trigger 168 and thus energize pulse timer 170. One of the relays 390 or 392 will be energized during the major portion of the time that the pitch control apparatus described herein is in use. Transfer switches 408 and 410 are so connected that in the event that the system malfunctions in some manner so that both switches would be actuated at the same time, no power would be applied to either of the field windings of the pitch control motor, even though the pulse timer 170 were actuated.

The pitch control motor circuit may be traced as follows. From terminal 308 through conductor 416, switch 300, conductor 310, the upper contact and blade of switch 410 when relay 390 is deenergized, the lower contact and blade of switch 408 when relay 392 is energized and conductor 418 to decrease pitch terminal 414. Conversely, if the sensing apparatus indicates the propeller pitch should be increased, the completed circuit is from terminal 308 through conductor 416, switch 300, conductor 310, the upper contact and switch blade of switch 408, conductor 420, the blade and lower contact of switch 410 and conductor 422 to terminal 412. The selected one of these two circuits will be energized for a period of time determined by pulse timer 170.

The period of pulse timer 170 is determined by networks 312 and 314, as already described. For decreasing pitch, the network 312 is connected through conductor 424, switch 400, conductors 426 and 288 and resistor 294 to the grid of triode 292, and conduction is thus maintained in timer 170 for a period as determined by the time constant of the RC network 312. During cycles of increasing pitch, network 314 controls the conduction of triode 292 through conductor 428, switch 402, conductors 426 and 288 and resistor 294. The purpose of the independent time constants for increasing and decreasing pitch results from the discovery that a longer period or higher torque is required to increase propeller pitch than is necessary to decrease propeller pitch through the same angle. Thus, the time constant of network 314 will generally be somewhat longer than the time constant of network 312.

The system as described will thus increase or decrease pitch as indicated by a comparison of signals generated in a phase discriminator and propeller demodulator, but it has been found that the response and stability of such a system does not reach the optimum performance anticipated. To further improve performance, a feedback signal is utilized from the output of the pitch control motor to the input of the pulser 30. Such a feedback loop, however, requires access to the propeller hub to provide a device to detect pitch change motor operation. Such a device is difficult to install and maintain. Thus, in accordance with this invention a pitch control motor analogue 180 is provided.

The analogue 180 includes a condenser 430 and resistors 432, 434 and 436. As above described, the operating characteristics of a pitch control motor differ depending upon the direction of rotation of the motor as a result of the required increased time for increasing propeller pitch. When propeller pitch is being decreased, resistor 432 is connected from the positive terminal 438 of a source of voltage through normally open switch 404 actuated by relay 392, conductor 446 and contacts 302 and 298 controlled by relay 296 to conductor 440 which is connected to one terminal of condenser 430. The network including resistor 432 and condenser 430 closely approximates the accelerating characteristic of pitch control motor 16 for decreasing pitch. Conversely, for increasing pitch the somewhat larger magnitude resistor 434 is connected to condenser 430 through the following circuit: From the negative terminal 442 through conductor 444, resistor 434, switch 406, conductor 446, contact 302 and switch blade 298 and conductor 440 to condenser 430. The other terminal of condenser 430 is connected to ground bus 50. Thus, the signal appearing across condenser 430 when pulse timer 170 is energized, closely approximates the acceleration of the pitch control motor 16, whether for increasing or decreasing pitch.

When the pitch control motor is deenergized, as explained in the application referred to above, a brake is applied to the system to quickly stop it. Thus, the time constant for deceleration is shorter than that for acceleration in either direction. To provide an analogue for this operation, resistor 436, which is smaller than either resistor 432 or resistor 434, is connected across condenser 430 to provide a discharge path therefor. This closed loop may be traced from ground 50 through resistor 436, conductor 448, switch contact 306 and blade 298 of relay 296, conductor 440 and condenser 430 to ground. The signal appearing across condenser 430, representing pitch control motor operation, is applied to a network comprising resistor 450 and condenser 452 in parallel with potentiometer 454 which constitute the equivalent of the aircraft engine time constant. Thus the signal appearing at the wiper of potentiometer 454 will be a synthetic acceleration signal representing the acceleration or deceleration of the aircraft engine in accordance with changes in propeller pitch as controlled by the pulser 30. This signal is applied through resistor 456 to the chopper circuit 162 in combination with the signals appearing at input terminal 160. Greatly enhanced stability and performance are provided by the use of the motor analogue circuit 180 and inner loop feedback described above. An alternate discharge path for condenser 430 is provided through conductor 440, switch 398, switch 396 and resistor 436 to ground 50. This alternate discharge path is utilized in contactor mode operation, as the pulse timer 170 is then continuously energized and could not be utilized for this purpose.

As explained hereinbefore in connection with the description of the operation sequence occurring upon de-energization of relay 276 of the timer control circuit 172 (see Fig. 3), conduction is maintained through the pulse timer circuit 170 for a time interval determined by the R-C time constant of one of the networks 312 or 314. Moreover, this conductive time interval is repetitive at a frequency determined by the magnitude of the signal developed at mixer 36. This mode of operation has been designated the pulsed mode because the pitch control motor 16 (Fig. 1) may be energized only during the automatically repetitive, or pulsed, time intervals, thereby making speed and phase control system more immune to spurious or transient phenomena. However, when it is desired to actuate the pitch control motor during a longer time interval, switch 304 may be actuated, thereby rendering the pulse timer circuit 170 continuously conductive. This mode of operation has been designated the contactor mode. Thus, when switch 304 is closed to provide contactor mode operation, the phase discriminator 178 will sense the signal polarity and minimum amplitude as it appears at terminal 160. The polarity switch 176 will control the pitch control motors in response thereto. In pulse mode operation, pulses of constant duration will operate the pitch control motors, and the pulse repetition rate will be directly related to the signal amplitude. As a result of the inertia and damping of the system, the pulses will act substantially as a continuous variable signal in the nature of a continuous linear mode servomechanism.

While one particular embodiment has been described hereinabove in detail, it will be apparent that various electronic circuits may be substituted for those described above, while still producing the accurate control of propeller position and velocity which is the principal object of this invention.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. An aircraft engine phase and speed control system comprising: an aircraft engine; a variable-pitch propeller coupled to the said engine; first means coupled mechanically to the said propeller for bi-directionally varying the propeller pitch; second means coupled to the said engine for generating a periodically-variable signal representing the instantaneous angular position of the said propeller and speed of the said engine; a source of periodically-variable reference signal representing a standard angular position of the said propeller and speed of the said engine; third means coupled to the said second means and to the said source for generating a signal representing the instantaneous difference between the said reference signal and the said position and speed signal; fourth means coupled to the said second means for transforming the said periodically-variable position and speed signal into a unidirectional voltage representing any instantaneous change in the speed of the said engine; fifth means for algebraically adding the said unidirectional voltage and the said difference signal to produce a resultant signal; sixth means coupled to the said fifth means for chopping the said resultant signal into pulses having amplitudes determined by the magnitude of the said resultant signal; seventh means coupled to the said sixth means for integrating the said pulses to produce a unidirectional control voltage; eighth means coupled to the said first and seventh means and responsive to the unidirectional control voltage to generate propeller-pitch control pulses having a repetition frequency determined by the magnitude of the said resultant signal; and ninth means coupled to the said eighth means and the said first means for energizing the first means to change the propeller pitch during the occurrence of the said propeller pitch control pulses.

2. An aircraft engine phase and speed control system as represented in claim 1, the said system further comprising a feedback channel coupled from the output of the said ninth means to the input of the said fifth means.

3. An aircraft engine phase and speed control system as represented in claim 2 wherein the said feedback channel comprises a multiplicity of means, each of said means operable to produce at least approximately an electrical analogue of the response characteristic of at least one of the said engine, variable-pitch propeller, or first means.

4. An aircraft engine phase and speed control system as represented in claim 3 wherein each of the said multiplicity of means comprises an electrical network.

5. An aircraft engine phase and speed control system as represented in claim 3 further comprising means for rendering operative at least one only of the said multiplicity of means, and means coupled to the said sixth means and to the said rendering means and responsive to the relative phase between the said pulse and a standard periodic signal for selecting the said at least one only means to be rendered operative, thereby effectively causing the said feedback channel to feed back only a signal approximating at least the response characteristic of at least one of the said engine, variable-pitch propeller, or first means.

6. An aircraft engine phase and speed control system as represented in claim 5 wherein the said selecting means comprises a phase discriminator and the said rendering means comprises a relay switching unit.

7. An aircraft engine phase and speed control system as represented in claim 5 further comprising means coupled to the said rendering means and to the said eighth means for establishing the duration of the propeller pitch control pulses such that each of the said pulses has one constant duration whenever the said system is operating to increase propeller pitch and another constant duration differing from the said one duration whenever the said system is operating to decrease propeller pitch.

8. An aircraft engine phase and speed control system as represented in claim 7 wherein the said rendering means is a relay switching unit and the said pulse-duration establishing means comprises two resistance-capacitance networks coupled through the said switching unit to the said eighth means.

9. In a rotational synchronizing system, the combination comprising a continuously rotatable member subject to variations in speed, tachometer means coupled to said rotatable member for producing a position signal representing the instantaneous angular position of said rotatable member, a source of reference signal representing a desired angular position of said rotatable member, comparator means coupled to said tachometer means and said reference source for developing an error signal having a magnitude representing any instantaneous error in the angular position of said rotatable member, pulse generating means coupled to said comparator means and responsive to said error signal for generating electrical pulses having a repetition frequency corresponding to the magnitude of said error signal, speed changing means coupled to said pulse generating means and to said rotatable member and operative in response to said pulses to change the speed of said rotatable member in a direction to restore the desired angular relationship between said rotatable member and said reference signal from said source, said speed changing means having a first response characteristic for one direction of error and a second response characteristic for the other direction of error, and means coupled to said comparator means and to said pulse generating means for causing said pulse generating means to generate pulses of longer duration for one of said error directions than the pulses generated for the other of said error directions.

10. In a rotational synchronizing system, the combination comprising a continuously rotatable member subject to variations in speed, tachometer means coupled to said rotatable member for producing a position signal representing the instantaneous angular position of said rotatable member, a source of reference signal representing a desired angular position of said rotatable member, comparator means coupled to said tachometer means and said reference source for developing an error signal having a magnitude representing any instantaneous error in the angular position of said rotatable member, an integrator coupled to said comparator means for producing an integrated signal representing an integrated function of said error signal, a pulse generator coupled to said integrator for producing a pulse in response to said integrated signal, means operable by said pulse generator for restoring said integrator to its original condition to start another integrating cycle, whereby the repetition frequency of the pulses generated by said pulse generator will be proportional to the magnitude of said error signal, and means coupled to said pulse generator and operative in response to said pulses for changing the speed of said rotatable member in a direction to restore the desired angular relationship between said rotatable member and said reference signal from said source.

References Cited in the file of this patent

UNITED STATES PATENTS

| | | |
|---|---|---|
| 2,382,847 | Baumann | Aug. 14, 1945 |
| 2,478,279 | Kochenburger | Aug. 9, 1949 |
| 2,517,703 | Offner | Aug. 8, 1950 |
| 2,543,077 | Treseder | Feb. 27, 1951 |
| 2,551,306 | Wisman | May 1, 1951 |
| 2,669,312 | Dinsmore | Feb. 16, 1954 |
| 2,708,258 | Westwood | May 10, 1955 |
| 2,747,141 | Hine | May 22, 1956 |
| 2,878,427 | Best | Mar. 17, 1959 |